March 15, 1938.  W. W. HALL  2,110,955

PLANTER ATTACHMENT

Original Filed June 19, 1936    2 Sheets-Sheet 1

Inventor
W. W. Hall

By Clarence A. O'Brien and
Hyman Berman
Attorneys

March 15, 1938.    W. W. HALL    2,110,955
PLANTER ATTACHMENT
Original Filed June 19, 1936    2 Sheets-Sheet 2
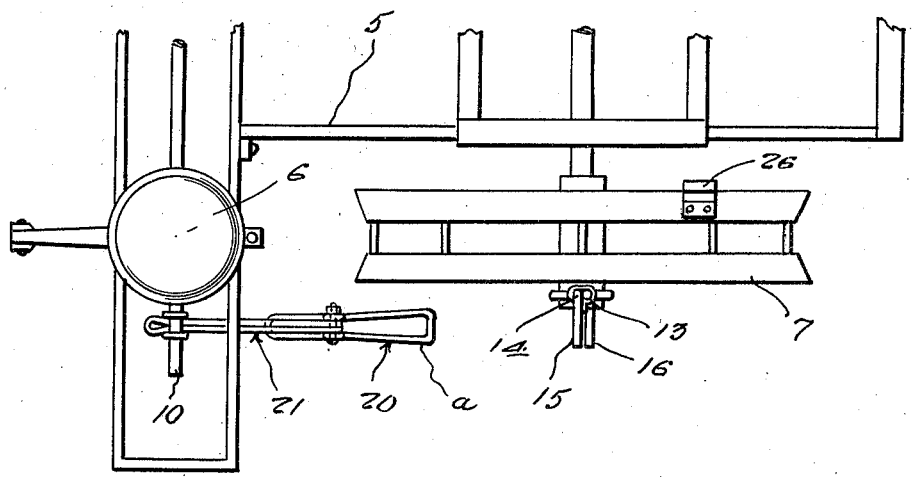
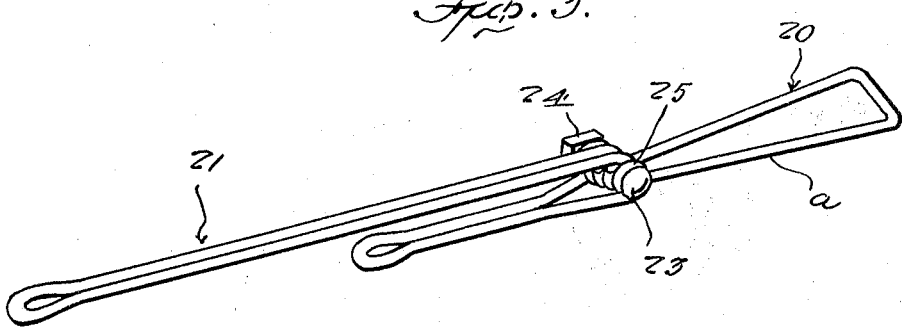
Inventor
W. W. Hall
By Clarence A O'Brien and
Hyman Berman
Attorneys Patented Mar. 15, 1938

2,110,955

UNITED STATES PATENT OFFICE 2,110,955

PLANTER ATTACHMENT

Warren Walter Hall, Lucas, Iowa

Application June 19, 1936, Serial No. 86,160
Renewed November 18, 1937

1 Claim. (Cl. 111—16)

This invention appertains to new and useful improvements in planting and more particularly to improvements in check row planters.

The principal object of the present invention is to provide an attachment for check row planters which is constructed in such a manner as to eliminate the usual trip wire, thus saving considerable time which is at the present required in winding and unwinding this wire.

Another important object of the invention is to provide a planter attachment of the character stated which is of simple construction and unsusceptible to the development of frequent defects.

These and various other important objects and advantages of the invention will become apparent to the reader of the following specification.

In the drawings:—

Figure 2 represents a fragmentary top plan view of a planter equipped with the attachment.

Figure 3 is a perspective view of the drop rod operating arms and swingable extension therefor.

Figure 1:
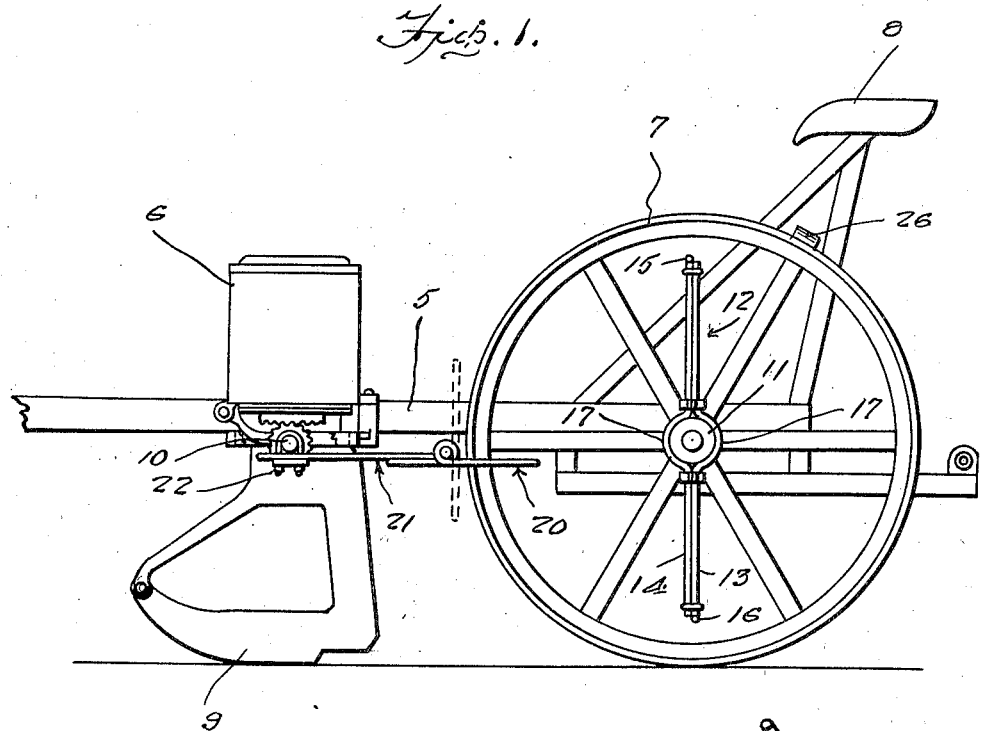
Figure 1 represents a side elevational view of the planter equipped with the attachment.
Figure 4:
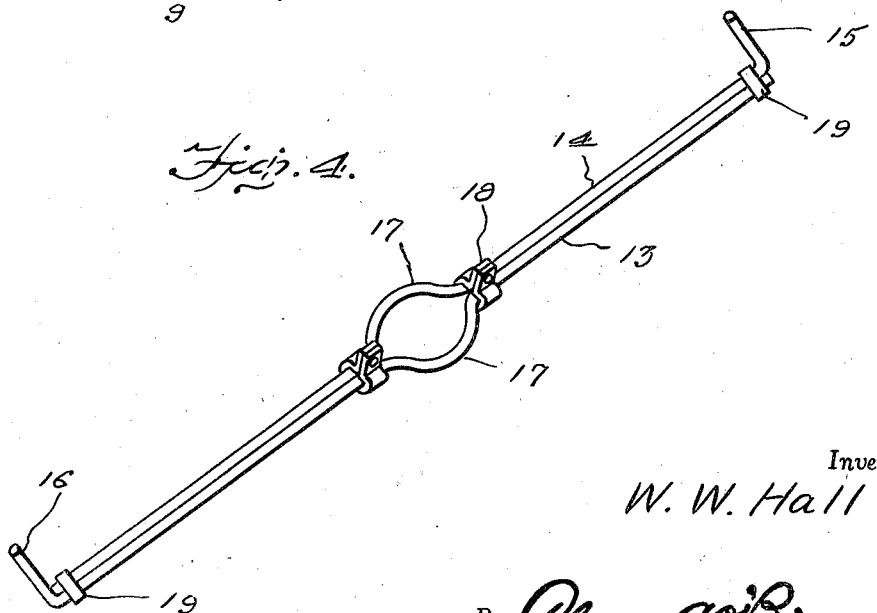
Figure 4 is a perspective view of the wheel carried trip.

Referring to the drawings wherein like numerals designate like parts, it can be seen in Figure 1, that numeral 5 represents the frame of the planter on which is mounted one or more seed boxes 6. This frame is supported by the usual ground wheels 7 and the frame also has a seat 8 upon which the operator can sit.

The ground runners are denoted by numeral 9 and the drop rod for operating the seed release is denoted by numeral 10.

In carrying out the present invention, the hub 11 of the wheel 7 is provided with the trip assembly generally referred to by numeral 12. This assembly consists of a pair of rods 13—14, one rod being provided with a laterally extending portion 15 at one end, while the opposite end of the other rod is likewise provided with a lateral extension 16. The intermediate portion of the rods are curved outwardly in a semi-circle as denoted by reference character 17 and adjacent these curved points the rods 13—14 are clamped together by suitable clamp members 18 which serve to hold the rods to the hub 11.

Additional clamp rings or retaining members 19 are provided adjacent the outer ends of the rods.

With the trip assembly 12 mounted as shown in Figure 1, the ends 15—16 protrude outwardly and as the wheel 7 rotates the same will strike the extension generally referred to by numeral 20 on the arm generally referred to by numeral 21.

The arm 21 consists of an elongated wire member bent upon itself to form an arm, one end of which is secured by the U-clamp 22 to the drop rod 10. The other end is wrapped around the bolt 23 which is equipped with a nut 24. The extension generally referred to by numeral 20 is an elongated narrow frame, the side portions of which are provided with a loop 25 closer to one end than the other and through these loops the bolt 23 extends. The extension 20 is therefore free to be swung from the horizontal position shown in Figure 1 to the dotted line position and from there onto the upper portion of the arm so as to retract the elongated portion $a$ of the extension from the path of the lateral extension 15—16 of the assembly 12. Thus it can be seen, that when the longer section of the extension 20 is in the position shown in Figure 1, the same will be struck every half revolution of the wheel 7 by the lateral end portions 15—16 of the assembly 12 and thus the seed will be dispensed from the hopper 6.

However, when the machine is to be brought off of the field, the extension can be swung so that the elongated section $a$ is brought to rest upon the arm 21.

The wheel is provided with a marker 26 thereon which will mark the corn hills.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

In combination, a planter including a seed hopper having a drop rod, a ground-engaging wheel, a pair of juxtaposed rods, each having one of their opposite ends bent laterally, the central portion of each rod being bent outwardly defining oppositely disposed semi-circular portions for the insertion of the hub therein, clamp means adjacent each side of the semi-circular portions for clamping said rods into engagement on said hub, an arm secured to the drop rod and having an extension disposed in the path of said laterally bent portion of said juxtaposed rods, said extension being swingably connected to the arm so that it can be removed from the path of the juxtaposed rods and swung to rest upon the arm, said extension being provided with an abutting portion for disposition against the bottom side of the arm when the extension is in projected position.

WARREN WALTER HALL.